United States Patent Office 3,227,570
Patented Jan. 4, 1966

3,227,570
CALCIUM SILICATE INSULATING MATERIAL
AND METHOD OF PRODUCING SAME
Dana L. Bishop, Granville, Ohio, assignor to Owens-Corning Fiberglas Corporation, a corporation of Delaware
No Drawing. Filed Nov. 14, 1961, Ser. No. 152,170
8 Claims. (Cl. 106—120)

The present invention relates to insulating materials of the silicate type and more particularly to those of the hydrous calcium silicate type.

The hydrous calcium silicate materials are formed generally by combining lime and silica as an aqueous slurry preferably containing the lime and silica in a prescribed ratio. The slurry is also formed to contain some additional materials, for example asbestos, in order to aid in supporting the granular components of the other ingredients and prevent their settling out on the bottom of the container in which the slurry is prepared, mixed or otherwise held for a time in process. The slurry is then heated in an autoclave under steam pressure for sufficient time to allow the lime and silica to react and form a crystalline product which is possessed of desirable heat insulation properties as well as strength and low density.

The slurry is usually mixed in large quantities involving hundreds of pounds of the ingredients. Since the density of the ultimate product must be sufficiently high in order that the ultimate integral product will have sufficient mass to be strong and capable of experiencing some physical mistreatment without destruction of its integral form which would destroy its heat insulative character; it is necessary that the solids, e.g. the amount of silica contributing substances, etc. be large in proportion to the water whereby the slurry is of considerable viscosity or low fluidity. The viscosity of the usual slurry may be likened to the consistency of heavy cream although somewhat more lumpy and not quite as uniform in consistency. It will be appreciated that the slurry as described must be removed from the mixing container and directed to the container, pan, or mold which the ultimate product must conform to and in order that the product may be exposed to further processing. Usually the mixing container is provided with a discharge vent through which the mixed slurry is allowed to pass as a stream, flowing into the shallow pans or the mold having the desired contour of the ultimately desired part. The slurry of high viscosity pours quite slowly and folds upon itself much like molasses will do. As a consequence, the folding of the thick mass upon itself results in considerable amounts of air being trapped in the mass forming voids and pinholes. Furthermore, where rather shallow pans are involved, and most critically where rather thin section molds are involved, the fold lines formed in the pouring of the slurry remain and do not dissipate upon further standing. As a consequence, further processing of the slurry in the shallow pans or molds yields a final formed dry product which contains these defects which are not only unsightly and undesirable but are also indicative of product which will exhibit a poorer performance. The formed voids or pinholes destroy the uniformity of the heat transfer of the section of dried product. Furthermore, this lack of uniformity detracts from the physical strength of the ultimately formed solid integral product such that failures frequently occur. It is also found that the fold lines represent fault lines passing throughout the ultimately formed articles leading to propagation of cracks and crevices when the solid piece is subjected to forces in the end use application.

Accordingly, it is an object to the present invention to provide a method of overcoming the foregoing deficiencies and shortcomings with respect to the present methods of forming the hydrous calcium silicate reaction products having utility as insulating materials.

It is also an object of the present invention to provide a method of preparing a lime-silica slurry which slurry is considerably less viscous than slurries known heretofore.

It is still another object of the present invention to provide a method which requires simply the addition of an agent which materially lowers the viscosity without otherwise interfering with the normal sequence and carrying out of the reactions involved between the reactants charged to the slurry mixing tank.

It is likewise an object of the present invention to provide a method as described which is capable of being carried out in a convenient and expeditious manner.

It is still another object of the present invention to provide a slurry, which is so formulated that the final product is stronger and possessed of improved insulation properties without the fold lines usually induced by high viscosity.

The above and additional objects of the present invention will become apparent to those skilled in the art from the following detailed description together with the recitation of several examples representing preferred embodiments of the present invention. All of the following description is in conformity with the patent statutes and the recitation of specific examples illustrating the practice of the invention is for the purpose of complying with the patent statutes.

The present invention in its simplest form constitutes the discovery that a particular class of salts and/or esters are capable of reducing the viscosity of a slurry of lime and silica (and which may include asbestos or other fillers) without detracting from or interfering with the normal sequence of the multiple step process or detracting from the properties of the calcium silicate material in its final integrated crystalline form.

There are a number of important considerations involved in the preparation of the slurry and the subsequent processing of the slurry to form the reaction product to yield an ultimate solid, integrated, porous microcrystalline mass. In the first place, the reactants must be present in a carefully predetermined and controlled ratio, e.g., 0.6–1.0 mol of lime to 1.0 mol of silica. If the ratio of lime and silica is not maintained within controlled limits, the reaction will not proceed properly to the formation of a useful micro-crystalline structure having utility as an insulating material. The ratio of the solids (lime, silica, and fillers where used, e.g. asbestos and the like) to the water must also be carefully controlled since the product must additionally fall within a range of density in order to have satisfactory strength and thermal performance. Further, the process must be carried out under closely controlled conditions and no additive must be included which might tend to cause the slurry, either under atmospheric conditions or under the induration conditions in the autoclave, that is under steam pressure and elevated temperature, to experience foaming, bubbling or ebullition leading to the formation of voids. Thus, once the character of the slurry is set as determined principally by viscosity determination and visual observation of the state of the mixing in the mixing step, it must not be disturbed or uniformity of thermal performance, strength and the like will be impaired. In other words, the reactions and the process involved is critical in nature. Many additives which might be considered desirable are unfortunately causative of foaming effects and the like which cannot be tolerated.

I have discovered fortuitously a class of substances which can be easily incorporated into the slurry and which do not cause any undesirable foaming or ebullition of the water component of the slurry, nor otherwise cause any adverse effects in the character of the final product—be it from a thermal performance point of view or from a strength point of view. Furthermore, if anything, the further processing is more efficiently carried out since the amount of rejected material is materially reduced by following the precepts of my discovery.

The materials which I have found to be useful in overcoming the problems enumerated hereinabove are derivatives of the hydrocarbon substituted sulphonates in the form of salts or esters.

The esters are usually formed of a metal sulfonate substituted carboxylic acid, most preferably a dicarboxylic acid. Examples include the alkyl and/or aryl esters of sodium, potassium, calcium or lithium sulfo-substituted dicarboxylic acid of which succinic is representative and has the structural formula:

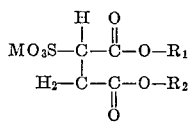

where M is Na, Ca, K or Li, $R_1$ is alkyl or aryl and $R_2$ is alkyl or aryl. Illustrative of such esters are the di-amyl ester of sodium, sulfosuccinic acid; the dihexyl ester of calcium sulfosuccinic acid; bis(tridecyl) ester of sodium sulfosuccinic acid; the dioctyl ester of potassium sulfosuccinic acid; bis(p-tert-butyl phenoxyethyl) sodium sulfosuccinate, having the formula:

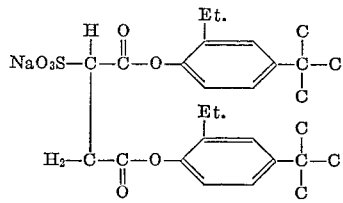

the alkyl and/or aryl esters of sodium, calcium, potassium or lithium sulfo-substituted glutaric, adipic, pimelic or the like acid. Additional ester derivatives of the sulfonate have a long chain fatty acid radical, e.g.

$$C_{17}H_{33}CONCH_3C_2H_4SO_3M$$

where M represents sodium, potassium, calcium or lithium.

The hydrocarbon substituted metal and/or amine salts of sulfonic acid are preferred viscosity reducing agents for the lime silica slurries in accordance with this invention. The metal in these salts are likewise either sodium, potassium, calcium or lithium; most preferably sodium or potassium.

The amine salts in accordance with the invention include dodecyl benzene triethanolamine sulfonate derived from dodecyl benzene and sulfonic acid; triethanolamine butylbenzene sulfonate; isopropylamine dodecylbenzene sulfonate; triethanolamine dodecyl benzene sulfonate, etc.

Other saltlike sulfonate derivatives which are useful in accordance with the present invention include sodium lignosulphonate, ammonium lignosulphonate, sodium oleyl p-anisidine sulfonate and the like.

Typical hydrocarbon substituted metal salts of sulfonic acid include: disodium dodecyldiphenyl oxide sulfonate; calcium propylbenzene sulfonte; lithium butyl benzene sulfonate; sodium xylene sulfonate; sodium toluene sulfonate; monobutyl-phenyl-phenol sodium monosulfonate; having the structural formula:

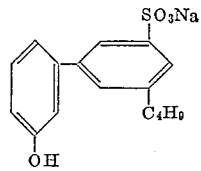

monobutyl biphenyl sodium monosulfonate, having the structural formula:

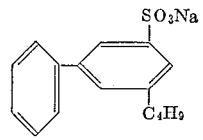

Of the salt derivatives of the sulfonate, those which are both alkyl and aryl substituted are preferred. Most preferably the aryl group should be a naphthalene ring. Examples include isopropylnaphthalene sodium sulfonate; polymethylene bis-naphthalene sodium sulfonate; sodium dialkyl naphthalene sulfonate; mono and dibutyl substituted naphthalene sodium sulfonate; and related salts. It will be appreciated that in the foregoing listing that the sodium may be replaced by any of the group—potassium, lithium or calcium, although of the metal salts those formed of sodium and potassium are preferred. Ideally, the alkyl group should have greater than one carbon atom preferably 3 to 9 carbon atoms. The viscosity reducing salts and esters of sulfonic acid which are disclosed hereinabove are anionic in character and are not to be confused with the nonionic and cationic salts. The napthalene salts are most preferred of the additives in accordance with the present invention since they are solid rather than liquids and are most expeditiously utilized in commercial sized operations. Also they are readily distributed in the slurry or in the preliminarily formed solution of lime and warm water. These naphthalene salts also are most efficient in reducing the viscosity without any attendant foaming. Lastly their efficiency in reducing viscosity is greater and, therefore, smaller amounts of these are needed to give an equivalent decrease in viscosity. As a consequence, more solids can be tolerated without encountering fold lines, trapped air, etc.—leading to a stronger more uniform performance product.

It is also most preferable that the agent or additive to be useful in accordance with the present invention be water soluble and thus be easily dissolved in the slurry and distributed evenly and uniformly throughout the slurry mass. The additive may be added to the dispersion of lime in water which is first prepared or it may be added to the slurry after the addition of the silica (or silica-contributing ingredients). Most preferably in order to insure even and proper distribution of the agent, it is added prior to the addition of the silica.

The slurry of silicia and water should be composed of a particular ratio of water to solids (silica, clay, abestos, etc.). A ratio of 70 parts of water to 100 parts of solids represents a minimum ratio of water and results in a product having a density of about 60 pounds per cubic foot. A ratio of 9 parts of water to 1 part of solids represents a maximum ratio of water and results in a product having a density of about 6 pounds per cubic foot.

The hydrous calcium silicate insulating materials produced in accordance with the teachings hereof are extremely useful materials since they can be formed into blocks which are capable of enduring high temperature. They also may be formed into pipe coverings or they may be formed into the cores of building units, such as doors, walls and the like. When properly formulated these insulating materials are quite strong and capable of supporting a considerable static load.

The following examples illustrate the practice of the invention but should not be considered as necessarily limitive as to the scope thereof.

Example I

A slurry of lime, silica and other ingredients is prepared in accordance with the following formulation.

| Raw materials: | Weight, pounds |
|---|---|
| Quick lime | 900 |
| Tripoli (quartz having about 99% silica) | 370 |
| Celatom (diatomaceous earth, 83% silica, remainder alumina) | 850 |
| Clay (40% silica) | 100 |
| Asbestos (3 parts chrysotile to 2 parts amosite) | 500 |
| Water | 16,000 |
| Isopropyl naphthalene sodium sulfonate (powder, 75% concentration) | 3 |

The lime was added to the previously warmed (78° F.) water followed by additions of the sulfonate. Afterwards the other ingredients are added in the order listed. The slurry ingredients were mixed thoroughly to insure complete and uniform distribution. No foaming was observed so it was poured into a mold defining one half of a pipe covering. The mold was then placed in a closed autoclave and the autoclave brought to a temperature of about 203° C. under a steam pressure of 225 lbs. per square inch gauge and maintained at these conditions for about 9 hours. At the end of this time, the product was removed from the mold and placed in a mild hot air oven (350° F.) to drive off any residual moisture. Examination of the product throughout—that is, examination of the outer surface and sections cut with a saw, reveal the product to be of uniform appearance and free from any fold lines or fault lines or pinholes which would indicate air entrapment in the pouring step. The product is rigid, porous, possessed of desirable heat insulative characteristics and is strong and capable of being handled without crumbling or deterioration.

The induration within an autoclave of the slurry mixture, having in mind the formulation changes, should be continued for a period of time measuring from 6 to 15 hours wherein the pressure is above atmospheric steam pressure, e.g., above 14.7 lbs. per square inch, and temperature in the range 140° C.–250° C.

Example II

The process described in Example I was repeated utilizing the same formulation except leaving out the isopropyl naphthalene sodium sulfonate. After induration and drying the product was found upon examination to be possessed of fold lines on the exterior surface of the part. Furthermore, cut sections of the product revealed pinholes demonstrating that air had been trapped in the pouring of the slurry into the mold even though performed with the procedure and care of Example I.

Example III

A formulation similar to that of Example I was carried out except that the amount of tripoli was increased to 900 pounds while the celatom and clay were omitted, thus yielding a product on induration having a lime to silica ratio of about 1.0 and thereby being composed principally of a microcrystalline lath-like structure of xonotlite. This final product likewise evidenced no fold lines or pinholes.

The utilization of a viscosity reducing material in accordance with the present invention and particularly those preferred viscosity reducing agents as described just prior to the examples yields a slurry having a viscosity, as determined by empirical tests, about 10% to 15% less than the same slurry not having the agent present. This empirical test is carried out as follows: A quantity of the mixed slurry is introduced into a container of approximately 2 quart capacity. The container is placed upon a scale above which is located a driven rotating spindle to which is secured a cone having its apex pointed straight down. The spindle is rotated at about 40 r.p.m. and the spindle and cone is lowered into the slurry in the 2 quart container therebeneath. The slurry resists penetration by the revolving cone and this resistance is measured by an increase in the weight of the container slurry. Most usually, the scale is set to zero, with the container of slurry on it so that the indicated weight in grams will represent the resistance.

Example IV

The procedure as described in Example I was repeated except that in place of the isopropyl naphthalene sodium sulfonate there was utilized a nonionic liquid of 100% concentration composed of a polyoxyethylene ester marketed under the trade name Hyonic PE–225. The viscosity (frequently and commonly referred to as consistency) was in fact increased as compared to a similarly prepared slurry not containing the Hyonic PE–225. Attempts pouring the slurry were accompanied by severe formation of fold lines and entrapment of air. Induration of the slurry containing the fold lines and entrapped air yielded an unacceptable product in terms of inferior physical strength and unsatisfactory thermal performance.

Example V

The procedure of preceding Example IV was repeated except that the time of addition of the Hyonic PE–225 was extended in an attempt to more efficiently incorporate the material into the slurry. Pouring of the slurry was still accompanied by the formation of fold lines and the entrapment of air. The fold lines and pinholes evidencing entrapped air were not dissipated upon induration of the product. The physical and thermal properties of the product were inferior to the properties of the product prepared in accordance with Example. I.

Example VI

The procedure of Example I was repeated except that in place of the isopropyl naphthalene sodium sulfonate there was utilized the material marketed under the trade name Neutronyx 611. The latter is a liquid nonionic alkyl phenol polyglycol ether containing 9 moles of ethylene oxide. The resulting slurry was viscous and pouring thereof was attendant with formation of fold lines and air entrapment. The indurated and dried product contained the fold lines and pinholes. The physical properties were inferior to those of the product of Example I.

Example VII

The procedure in Example I was repeated except that in place of the isopropyl naphthalene sodium sulfonate there was utilized the material

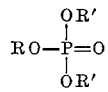

wherein the R′ represents water solubilizing groups and the R is a hexyl group. This phosphate type of material is a nonionic liquid of 100% concentration and is marketed under the trade name Victawet 12. It dissolved satisfactorily either when added to the lime solution or when added to the slurry. The foaming was not critical, however, upon addition to the slurry the viscosity became greater. Testing of the thickened slurry using the rotating cone as described hereinabove revealed the viscosity to be about 5% increased. As a consequence, the pouring was even more difficult than in the absence of the phosphate material. Furthermore, fold lines and entrapped air were very much in evidence.

Example VIII

The procedure and formulation in accordance with Example I was repeated except that there was utilized, as the viscosity reducing ingredient, polyoxyethylene sorbitan monostearate. This nonionic liquid of 100% concentration is marketed under the trade name Tween 81 was added to the aqueous line solution in one trial and to the slurry in another. In both cases the viscosity of the ultimate slurry was found to be even greater than in the absence of the Tween 81. Pouring of the slurry resulted in fold lines which did not dissipate on standing. Considerable entrapped air was evidenced by pinholes in the final dried product.

*Example IX*

The procedure and formulation as set forth in Example I was repeated except that there was utilized as the viscosity decreasing ingredient a mixture of mono and dibutyl substituted naphthalene sodium sulfonates. The slurry evidenced no foaming during mixing or later processing. No fold lines were noted nor was any air entrapped. The product after induration and drying was fully comparable to the product described in Example I. The same results were obtained in a separate preparation where the mixture of mono and dibutyl substituted naphthalene sodium sulfonates was added after the other ingredients.

*Example X*

The procedure and formulation of Example III was repeated except that there was utilized as the viscosity decreasing agent the sodium salt of a slightly condensed mononaphthalene sulfonic acid. The results were comparable to that of the preceding example.

From the foregoing, it may be seen that I have provided a unique scheme for reducing the viscosity of a slurry of multiple ingredients having diverse functionalities—all without interfering with the inter reaction of these various functions and without encountering any other effects deleterious to the process in general or the performance of the final product.

The agent, whether it be ester or salt, in accordance with the present invention need be used in only very minor amounts. As little as about 0.01% on the basis of the dry weight of the solids is effective, although usually I may prefer to use about 0.03 to 0.30 weight percent. Amounts in excess of 0.50 may be used but do not seem to improve the results.

It is considered surprising and unexpected that such a small amount of the materials which I have discovered would provide such a marked decrease in the viscosity—all without any accompanying foaming or production of bubbles and cells which frequently are encountered in cases where the viscosity of a material is being reduced. Thus, generally, the two go quite closely hand in hand. This is particularly true in dealing with the ingredients involved here. namely: lime and silica, and also considering the temperatures to which the slurry is raised in the induration step and even regarding the pressure consideration involved. As has been indicated hereinabove this reduction in viscosity eliminates very serious deficiencies of a slurry formulated to achieve the optimum in thermal and strength properties.

While I have disclosed the invention in considerable detail and set forth with specificity a number of examples illustrating the actual practice of my invention, I do not intend to be solely limited thereto since other obvious modifications in ingredients, proportions and amounts will be suggested by this disclosure to those skilled in the art who will be cognizant of the spirit and scope of the invention as established by the appended claims.

I claim:

1. In the method of producing a dry, solid, integral hydrous calcium silicate, wherein a slurry of water, lime and silica-contributing substance is formed, with a lime/silica ratio in the range of 0.60 to 1.0 mol of line to 1.0 mol of silica and said slurry is subsequently steam indurated at elevated temperatures under steam pressure; the improvement whereby there is added from about 0.01 to about 0.5% based on the dry weight of the solids in said slurry of an alkyl naphthalene metal sulfonate, said metal being selected from the group consisting of sodium and potassium, said alkyl group being one possessing 3 to 9 carbon atoms inclusive.

2. In the method of producing a dry, solid, integral hydrous calcium silicate, wherein a slurry of water, lime and silica-contributing substance is formed, with a lime/silica ratio in the range of 0.60 to 1.0 mol of line to 1.0 mol of silica and said slurry is subsequently steam indurated at elevated temperatures and under a steam pressure sufficient to prevent ebullition of the slurry; the improvement whereby there is added from about 0.01 to about 0.5% based on the dry weight of the solids in said slurry of an alkyl naphthalene metal sulfonate, said metal being selected from the group consisting of sodium and potassium, said alkyl being one of from 3 to 9 carbon atoms inclusive.

3. The method as claimed in claim 2 wherein said metal is sodium.

4. The method as claimed in claim 3 wherein the said alkyl group is butyl.

5. The method as claimed in claim 3 wherein the sulfonate salt is a mixture of mono and dibutyl naphthalene sodium sulfonates.

6. The method as claimed in claim 3, wherein the said alkyl group is isopropyl.

7. An improved aqueous slurry composed principally of water, lime and finely-divided silica-contributing substances, said slurry being adapted to form, after 6–15 hours' exposure to above atmospheric steam pressures and temperatures in the range of 140° C. to 250° C., a hydrous calcium silicate reaction product of integral but porous, microcrystalline structure, said slurry containing from about 0.01 to about 0.5 percent based on the dry weight of the solids in said slurry of an alkyl naphthalene metal sulfonate, said metal being selected from the group consisting of sodium and potassium, said alkyl group being one of from 3 to 9 carbon atoms inclusive.

8. An improved aqueous slurry composed principally of water, lime and finely-divided silica-contributing substances, said slurry being adapted to form, after 6–15 hours' exposure to above atmospheric steam pressures and temperatures in the range of 140° C. to 250° C., a hydrous calcium silicate reaction product of integral but porous, microcrystalline structure, said slurry containing from about 0.01 to about 0.5 percent based on the dry weight of the solids in said slurry of an alkyl naphthalene sodium sulfonate, said alkyl being one of 3 to 9 carbon atoms inclusive.

References Cited by the Examiner

UNITED STATES PATENTS

| | | | |
|---|---|---|---|
| 2,476,306 | 7/1949 | King | 106—119 |
| 2,534,303 | 12/1950 | Serinis | 106—120 X |
| 2,547,127 | 4/1951 | Kalousek | 23—110 |
| 2,662,024 | 12/1953 | Riddell et al. | 106—111 |
| 2,703,289 | 3/1955 | Willson | 106—90 |
| 2,913,346 | 11/1959 | Hoffman | 106—111 |
| 3,100,156 | 8/1963 | Halousek | 106—120 |
| 3,128,222 | 4/1964 | Herschler et al. | 252—353 |

TOBIAS LEVOW, *Primary Examiner.*

JOHN R. SPECK, *Examiner.*